United States Patent Office 3,382,253
Patented May 7, 1968

3,382,253
17α-OXYGENATED-B-NORPREGN-
4-ENE-3,20-DIONES
Kenneth G. Holden, Stratford, N.J., and James F. Kerwin, Broomall, Pa., assignors to Smith Kline & French Laboratories, Philadelphia, Pa., a corporation of Pennsylvania
No Drawing. Filed Oct. 19, 1964, Ser. No. 404,937
6 Claims. (Cl. 260—340.5)

ABSTRACT OF THE DISCLOSURE

Cyclic ketals of 16α,17α-dihydroxy-B-norpregn-4-ene-3,20-diones and 17α-acetoxy-B-norpregn-4-ene-3,20-dione are prepared by ring-contraction of the corresponding 3-acetoxypregn-5-ene-3,20-diones. The products are hydrolyzed to the alcohols and possess progestational activity.

---

The present invention relates to new 17α-oxygenated-B-norpregn-4-ene-3,20-diones having progestational activity. In particular, the invention relates to 17α-hydroxy and 17α-lower acyloxy-B-norpregn-4-ene-3,20-diones, 16α,17α-dihydroxy-B-norpregn-4-ene-3,20-dione, and to cyclic ketals of 16α,17α-dihydroxy-B-norpregn-4-ene-3,20-dione.

The compounds of the invention thus may be represented by the following structural formulas:

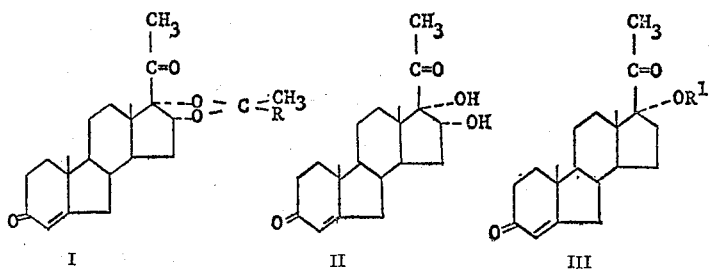

wherein:
R is methyl or phenyl; and
R¹ is hydrogen or acetyl.

The compounds of the invention are prepared from compounds having a 6-membered B-ring, by means of a ring-opening and ring-closure sequence that results in the loss of a carbon atom as carbon dioxide. This sequence of reactions is illustrated below for the preparation of 16a,17a-isopropylidenedioxy - B - norpregn-4-ene-3,20-dione (VIII).

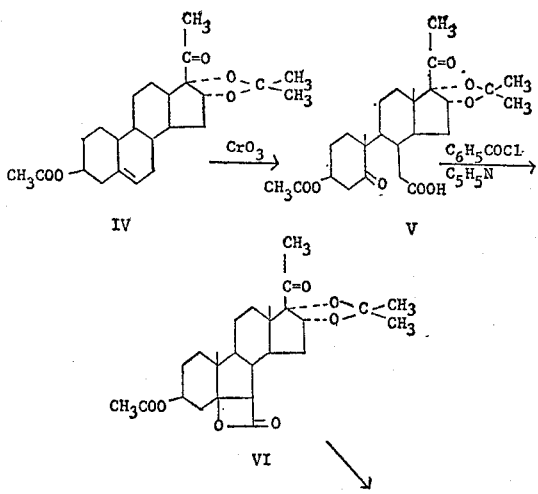

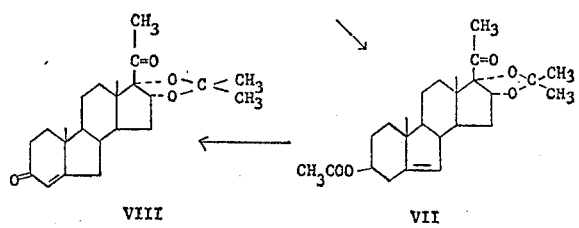

A solution of 16α,17α-isopropylidenedioxypregnenolone acetate (IV) in acetic acid is oxidized with chromium trioxide. The resulting products are the 5-oxo-5,6-seco-6-carboxylic acid (V) and 7-oxo-16α,17α-isopropylidenedioxypregnenolone acetate. The seco compound is treated with benzoyl chloride and pyridine to simultaneously enolize, ring-close, and lactonize to give 3β-acetoxy-5β-hydroxy - 16α,17α - isopropylidenedioxy - 20 - oxo-B-norpregnane-6β-carboxylic acid β-lactone (VI). Fusion of this compound results in elimination of carbon dioxide. The acetate group of the resulting B-norpregnenolone acetate (VII) is then selectively hydrolyzed with, for example, potassium hydroxide, and the resulting 3-alcohol is subjected to Oppenauer oxidation conditions, e.g., aluminum isopropoxide and a ketone such as cyclohexanone, for oxidation to the product VIII. This compound has been found to possess progestational activity when evaluated in animals according to standard evaluation procedures.

Heating 16α,17α-isopropylidenedioxy - B - norpregn-4-ene-3-20-dione in 90% formic acid at 40° C. for about twenty hours cleaves the ketal group and results in the formation of a 16-formate, which is then hydrolyzed to the 16α,17α-diol II by basic hydrolysis.

A B-norpregn-4-ene-3,20-dione of Formula I in which R is phenyl is prepared by starting with a ketal formed from acetophenone and 16α,17α-dihydroxypregnenolone acetate and carrying out the same reaction sequence as described above.

When 17α-acetoxypregnenolone acetate is used as the starting material, 17α-acetoxy - B - norpregn-4-ene-3,20-dione(Formula III, in which R¹ is acetyl) is produced. Hydrolysis of the acetate function by refluxing in a base such as methanolic potassium hydroxide results in the formation of 17α-hydroxy - B - norpregn-4-ene-3,20-dione (Formula III, in which R is hydrogen).

It will be apparent to one skilled in the art of chemistry that the starting materials for the preparation of the compounds of the invention may have certain variants thereof, and that products resulting therefrom may also have such variants. For example, if, instead of utilizing the acetone ketal of 16α,17α-dihydroxypregnenolone acetate (IV), one uses the homologous 2-butanone or 3-pentanone ketal as starting materials, the correspondingly homologous 1-methylpropylidenedioxy and 1 - ethylpropylidenedioxy products, respectively, are produced.

In addition it will be obvious that instead of utilizing 17α-acetoxy-B-norpregn-4-ene-3,20-dione as starting material, the 17α-propionate, butyrate, or isobutyrate can be employed. The products will thus be the 17α-propionate, butyrate, and isobutyrate, respectively, of 17α-hydroxy-B-norpregn-4-ene-3,20-dione.

These above-mentioned variations are obvious to one skilled in the art of organic chemistry and are thus considered to be the full equivalents of the compounds specifically claimed.

The following experimental procedures illustrate the best mode of preparing the compounds of the invention, but are to be considered as merely illustrative thereof, and not limiting of the scope of the invention.

Example 1.—16α,17α-isopropylidenedioxy-B-norpregn-4-ene-3,20-dione

To a solution of 6 g. of 16α,17α-isopropylidenedioxypregnennolone acetate [G. Cooley, B. Ellis, F. Hartley and V. Petrow, J. Chem. Soc., 4373 (1955)] in 60 ml. of glacial acetic acid is added 3.77 g. of chromium trioxide in 10 ml. of 50% aqueous acetic acid. The addition is carried out during 1 hour with stirring at 55° C. After an additional 2 hours at 55°, the reaction mixture is cooled, treated with 3.7 ml. of methanol to destroy excess oxidant, and concentrated at reduced pressure. The concentrate is diluted with 10 volumes of water and extracted with ether. After washing the organic extracts with aqueous sodium carbonate solution, they are combined, dried and evaporated to a residue of 7-oxo-16α,17α-isopropylidenedioxypregnenolone acetate, M.P. 173–175.5° after recrystallization from acetone-hexane. The aqueous sodium carbonate phases are combined, acidified with hydrochloric acid and extracted with ether. Combination, drying and evaporation of the ether extracts gives crude 3β-acetoxy - 16α,17α - isopropylidenedioxy - 5,20 - dioxo - 5,6-secopregnan-6-oic acid, which is used directly in the next step without further purification.

A solution of 4.0 g. of crude 3β-acetoxy-16α,17α-isopropylidenedioxy-5,20-dioxo-5,6-secopregnan-6-oic acid in 25 ml. of pyridine is treated with 2.6 ml. of benzoyl chloride. After 48 hours at room temperature the reaction mixture is poured into 250 ml. of water and extracted with ether. The ether extracts are washed with 4% sodium hydroxide and 5% sodium bicarbonate solutions, combined, dried and evaporated to give 3β-acetoxy-5β - hydroxy - 16α,17α - isopropylidenedioxy - 20 - oxo-B-norpregnane-6β-carboxylic acid β-lactone, M.P. 153–155° (dec.) after recrystallization from acetone-hexane. 3β - acetoxy - 5β - hydroxy - 16α,17α - isopropylidenedioxy-20-oxo - B - norpregnane-6β-carboxylic acid β-lactone (1.1 g.) is heated above its melting point for 15 minutes under a nitrogen atmosphere. The cooled product is crystallized from methanol and then from acetone-hexane to give 16α,17α-isopropylidenedioxy-B-norpregnenolone acetate, M.P. 169–171°.

A solution of 2.0 g. of 16α,17α-isopropylidenedioxy-B-norpregnenolone acetate in 60 ml. of 95% ethanol containing 6 g. of potassium hydroxide is refluxed under a nitrogen atmosphere for 2 hours. The reaction mixture is concentrated at reduced pressure, poured into 10 volumes of water and extracted with methylene chloride. Drying and evaporation of the methylene chloride extracts gives 16α,17α - isopropylidenedioxy - B - norpregnenolone, M.P. 184.5–186° after recrystallization from ligroin.

A solution of 1.5 g. of 16α,17α-isopropylidenedioxy-B-norpregnenolone in 250 ml. of toluene containing 1.0 g. of aluminum isopropoxide and 20 ml. of cyclohexanone is slowly distilled under a nitrogen atmosphere during 2 hours so that the reaction mixture is reduced to a volume of about 50 ml. After cooling, the reaction mixture is poured into 150 ml. of cold 5% hydrochloric acid and extracted with ether. The ether extracts are washed with dilute sodium bicarbonate solution, combined, and steam-distilled until the distillate is clear. The nonvolatile aqueous mixture is cooled and extracted with ether-ethyl acetate. Drying and evaporation of the organic extracts yields the crude product which is purified by crystallization from acetone-hexane to give pure 16α,17α-isopropylidenedioxy-B-norpregn-4-ene-3,20 - dione, M.P. 187–189°.

Example 2.—16α,17α-dihydroxy-B-norpregn-4-ene-3,20-dione

A solution of 16α,17α-isopropylidenedioxy-B-norpregn-4-ene-3,20-dione (1 g.) in 50 ml. of 90% formic acid is heated at 40° for 20 hours. The cooled reaction mixture is diluted with 10 volumes of water and extracted with methylene chloride. Evaporation of the methylene chloride extracts gives the 16-formate of the title compound. The 16-formate is dissolved in 40 ml. of methanol and refluxed with 10 ml. of 10% aqueous sodium carbonate solution for 2 hours. The warm reaction mixture is diluted with 5 volumes of water, cooled and filtered to give the title product.

Example 3.—16α,17α-(1-phenylethylidenedioxy)-B-norpregn-4-ene-3,20-dione

This compound is prepared according to the procedure of Example 1. To a solution of 6.6 g. of 16α,17α-(1-phenylethylidenedioxy)pregnenolone acetate in 60 ml. of glacial acetic acid is added 3.77 g. of chromium trioxide in 10 ml. of 50% aqueous acetic acid. The reaction is carried out and worked up as in Example 1 to give 3β-acetoxy - 16α,17α - (1-phenylethylidenedioxy)5,20-dioxo-5,6-secopregnan-6-oic acid. This seco compound is dissolved in 25 ml. of pyridine and 2.6 ml. of benzoyl chloride is added. After standing 48 hours at room temperature, the reaction is worked up to give 3β-acetoxy-5β-hydroxy - 16α,17α - (1 - phenylethylidenedioxy) - 20-oxo-B-norpregnane-6β-carboxylic acid β-lactone.

The lactone is heated above its melting point for 15 minutes in a nitrogen atmosphere and then crystallized to give 16α,17α - (1-phenylethylidenedioxy)-B-norpregnenolone acetate, which is refluxed in 60 ml. of 95% ethanol containing 6 g. of potassium hydroxide for 2 hours. The work-up gives 16α,17α-(1-phenylethylidenedioxy)-B-norpregnenolone.

A solution of this compound is 250 ml. of toluene containing 1.0 g. of aluminum isopropoxide and 20 ml. of cyclohexanone is slowly distilled under nitrogen during 2 hours until one-half the original volume remains. The reaction mixture is then worked up as in Example 1 to give the title product, 16α,17α-(1-phenylethylidenedioxy)-B-norpregn-4-ene-3,20-dione.

Example 4.—17α-acetoxy-B-norpregn-4-ene-3,20-dione

Starting with 30 g. of 17α-acetoxypregnenolone acetate there is obtained 7-oxo-17α-acetoxypregnenolone acetate, M.P. 235–236.5° from acetone-hexane, and crude 3β,17α-diacetoxy-5,20 - dioxo-5,6-secopregnan-6-oic by oxidation as described in Example 1.

The crude seco acid (18.3 g.) is lactonized with benzoyl chloride in pyridine, as described in Example 1, to give crude 3β,17α - diacetoxy - 5β - hydroxy - 20 - oxo - B-norpregnane-6β-carboxylic acid β-lactone. By heating this material (21 g.) at 190° under nitrogen for 15 minutes there is obtained 17α-acetoxy-B-norpregnenolone acetate, M.P. 212.5–214° from acetone.

Selective saponification of the 3β-acetoxy group is carried out as follows. A solution of 11 g. of 17α-acetoxy-B - norpregnenolone acetate in 800 ml. of methanol is treated dropwise with 1.54 g. of potassium hydroxide in 10 ml. of water. After stirring for 2 hours at room temperature the reaction mixture is concentrated under reduced pressure and cooled. The product is collected by filtration and recrystallized from methanol to give 17α-acetoxy-B-norpregnenolone, M.P. 241–243.5°. Oppenauer oxidation of 5.2 g. of 17α-acetoxy-B-norpregnenolone, as described in Example 1, gives 17α-acetoxy-B-norpregn-4-ene-3,20-dione, M.P. 208–210°, from acetone-hexane.

Example 5.—17α-hydroxy-B-norpregn-4-ene,3,20-dione

A solution of 1 g. of 17α-acetoxy-B-norpregn-4-ene-3,20-dione in 30 ml. of methanol is heated to reflux and a solution of 0.175 g. of potassium hydroxide in 5 ml. of water is slowly added over a 30 minute period. After refluxing for 2 hours the solution is cooled, poured into 10 volumes of water and extracted with methylene chloride. Drying and evaporation of the methylene chloride extracts gives the title product, which is purified by recrystallization from acetone-hexane.

We claim:
1. A chemical compound selected from the group consisting of steroids of the formula:

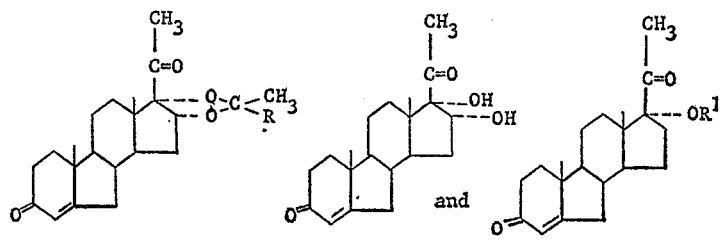

wherein:
R is selected from the group consisting of methyl and phenyl; and
R¹ is selected from the group consisting of hydrogen and acetyl.
2. 16α,17α-isopropylidenedioxy - B - norpregn-4-ene-3,20-dione.
3. 16α,17α-(1-phenylethylidenedioxy) - B - norpregn-4-ene-3,20-dione.
4. 16α,17α-dihydroxy-B-norpregn-4-ene-3,20-dione.
5. 17α-acetoxy-B-norpregn-4-ene-3,20-dione.
6. 17α-hydroxy-B-norpregn-4-ene-3,20-dione.

References Cited
UNITED STATES PATENTS

| | | | |
|---|---|---|---|
| 3,072,681 | 1/1963 | Kerwin | 260—343.2 |
| 3,284,505 | 11/1966 | Holden et al. | 260—586 |
| 3,287,412 | 11/1966 | Fare et al. | 260—586 |
| 3,293,300 | 12/1966 | Fare et al. | 260—586 |

NICHOLAS S. RIZZO, *Primary Examiner.*
J. H. TURNIPSEED, *Assistant Examiner.*